United States Patent Office 2,865,950
Patented Dec. 23, 1958

2,865,950
METHOD OF PREPARING O,O-DIALKYL ALKYLTHIOALKYL PHOSPHOROTHIOATES

Richard L. McConnell, Kingsport, Tenn., assignor to Eastman Kodak Company, Rochester, N. Y., a corporation of New Jersey No Drawing. Application October 8, 1956
Serial No. 614,360

7 Claims. (Cl. 260—461)

This invention relates to a novel process for the production of organophosphorus compounds. In a preferred embodiment, it relates to a novel process for the production of O,O-dialkyl alkylthioalkyl phosphorothioates.

The value and importance of organophosphorus compounds have been established in many fields. This has been well illustrated by the use of organophosphorus compounds as plasticizers, insecticides, pesticides, fungicides, stabilizers for artificial resins and related uses. Consequently, any means by which organophosphorus compounds may be more effectively and advantageously produced has considerable importance to the art and to the commercial employment of same. Accordingly, it is an object of this invention to provide a new and valuable synthesis for the production of organophosphorus compounds, to provide a means of production of organophosphorus compounds which has marked commercial advantage over prior methods, to provide a novel means for the production of insecticidally active compounds, and to provide a novel means of production of O,O-dialkyl alkylthioalkyl phosphorothioates. These and other objects will be apparent from the description and claims that follow.

I have found that trialkyl phosphites can be reacted with cyclic disulfides to produce valuable organophosphorus compounds. In a preferred embodiment, trialkyl phosphites are reacted with cyclic disulfides to produce O,O-dialkyl alkylthioalkyl phosphorothioates. The trialkyl phosphites which find particularly advantageous employment in the process include those containing from 1 to 4 carbon atoms in each alkyl group. A preferred group of cyclic disulfide reactants includes ethylene disulfide, 1,2,5,6-tetrathiocane, trimethylene disulfide, 1,2,4,6-tetrathiepane, and 1,2,5,7-tetrathionane; moreover, the 1,2-polythiocycloalkanes generally are preferred in the practice of the invention, particularly those containing from 2 to 8 carbon atoms and containing 2 or 4 sulfur atoms. Illustrative of this aspect of the invention are the following equations:

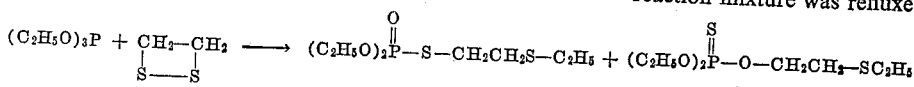

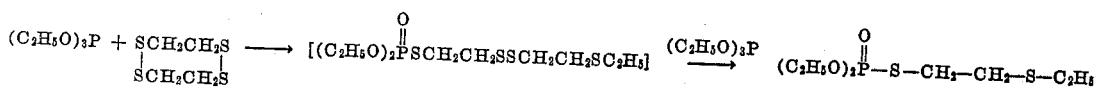

It is to be noted that the reaction product of the above reactions, and of a preferred embodiment, is a mixture of thiolo and thiono isomers. This product is an excellent systemic insecticide which is being marketed commercially at the present time. This aspect of my invention is extremely useful not only in that an established insecticidal product is produced, but also that no corrosive intermediates are used, thus eliminating the need for corrosion-resistant vessels; in addition, since no by-products are formed, their removal is not a problem of production. Suitable reaction times for my invention include periods of from 2 to 36 hours; however, I prefer to operate for reaction periods of from 8 to 16 hours. The reaction may be effected advantageously within a temperature range of from 0 to 175° C. While the reaction involved in the practice of my invention is a general one, the following specific examples are offered in illustration of my invention and show the practice of certain preferred embodiments thereof:

Example 1.—O,O-diethyl ethylthioethyl phosphorothioate

and

A mixture of triethyl phosphite (0.8 mole) and ethylene disulfide (0.2 mole) was refluxed gently with stirring for 12 hours. The excess triethyl phosphite was distilled off in vacuo leaving an oil, $n_D^{20}$ 1.4922. This crude product is good enough for insecticidal purposes; however, it may be purified by distillation in vacuo. The product boils at 115–120° C. (0.7 mm.).

Example 2.—O,O-diethyl ethylthioethyl phosphorothioate

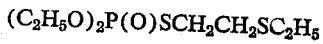

and

Triethyl phosphite (0.8 mole) and 1,2,5,6-tetrathiocane (0.1 mole) were reacted according to the procedure given in Example 1. The reaction product was a mixture of thiolo and thiono isomers.

Example 3.—O,O-diethyl ethylthiopropyl phosphorothioate

and

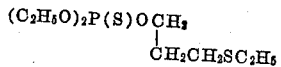

This product was prepared from triethyl phosphite (1.0 mole) and trimethylene disulfide (0.2 mole) according to the procedure of Example 1 except that the reaction mixture was refluxed for 16 hours instead of 12.

Example 4.—O,O-dipropyl propylthiomethylthiomethylthiomethyl phosphorothioate

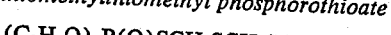

and

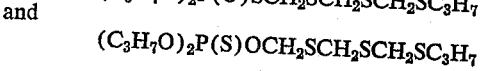

This product was prepared from tripropyl phosphite (0.8 mole) and 1,2,4,6-tetrathiepane (0.2 mole) according to the procedure of Example 1 except that the reaction mixture was heated at a pot temperature of 150° C. for 24 hours.

*Example 5.—O,O-dibutyl {2[(2-butylthioethylthio) methylthio]ethyl} phosphorothioate*

$$(C_4H_9O)_2P(O)SCH_2CH_2SCH_2SCH_2CH_2SC_4H_9$$

and $$(C_4H_9O)_2P(S)OCH_2CH_2SCH_2SCH_2CH_2SC_4H_9$$

This product was prepared from tributyl phosphite (1.0 mole) and 1,2,5,7-tetrathionane (0.2 mole) according to the procedure of Example 1 except that the reaction mixture was heated at a pot temperature of 160° C. for 36 hours.

*Example 6.—O,O-diethyl ethylthioethyl phosphorothioate*

$$(C_2H_5O)_2P(O)SCH_2CH_2SC_2H_5$$

and $$(C_2H_5O)_2P(S)OCH_2CH_2SC_2H_5$$

Triethyl phosphite (0.4 mole) and ethylene disulfide (0.4 mole) were placed in 400 ml. of xylene and refluxed for 16 hours. The solvent was removed in vacuo leaving the product as a dark oil. Distillation of this oil in vacuo gave a transparent oil, B. P. 122–130° C. (1.0 mm.).

Thus, the foregoing illustrates to one skilled in the art that my invention introduces new and valuable means by which many useful compounds may be produced, both as specifically illustrated in particular embodiments shown above, and in those others which are within the scope and spirit of the invention as described hereinabove and as defined in the appended claims.

I claim:

1. The process for producing O,O-dialkyl alkylthioalkyl phosphorothioates which comprises reacting a tri-lower alkyl posphite with a cyclic sulfide selected from the group consisting of cyclic disulfides containing an alkylene substituent of 2 to 3 carbon atoms and cyclic tetrasulfides with from 2 to 3 lower alkylene substituents each having from 1 to 2 carbon atoms at a temperature within the range of 0–175° C. and for a period of time within the range of 2 to 36 hours.

2. The process which comprises reacting a trialkyl phosphite containing from 1 to 4 carbon atoms in each alkyl group with a cyclic sulfide selected from the group consisting of ethylene disulfide, 1,2,5,6-tetrathiocane, trimethylene disulfide, 1,2,4,6-tetrathiepane, and 1,2,5,7-tetrathionane at a temperature within the range of 0–175° C. and for a period of time within the range of 2–36 hours.

3. The process which comprises reacting triethyl phosphite with ethylene disulfide within the temperature range of from 0 to 175° C. and for reaction periods of from 2 to 36 hours to produce O,O-diethylethylthioethyl phosphorothioate.

4. The process which comprises reacting triethyl phosphite with 1,2,5,6-tetrathiocane within the temperature range of from 0 to 175° C. and for reaction periods of from 2 to 36 hours to produce O,O-diethyl ethylthioethyl phosphorothioate.

5. The process which comprises reacting triethyl phosphite with trimethylene disulfide within the temperature range of from 0 to 175° C. and for reaction periods of from 2 to 36 hours to produce O,O-diethyl ethylthiopropyl phosphorothioate.

6. The process which comprises reacting tripropyl phosphite with 1,2,4,6-tetrathiepane within the temperature range of from 0 to 175° C. and for reaction periods of from 2 to 36 hours to produce O,O-dipropyl propylthiomethylthiomethylthiomethyl phosphorothioate.

7. The process which comprises reacting tributyl phosphite with 1,2,5,7-tetrathionane within the temperature range of from 0 to 175° C. and for reaction periods of from 2 to 36 hours to produce O,O-dibutyl {2[(2-butylthioethylthio)methylthio]ethyl} phosphorothioate.

No references cited.